(12) United States Patent
Shemer et al.

(10) Patent No.: US 12,271,397 B2
(45) Date of Patent: Apr. 8, 2025

(54) CLIENT DEVICES AND DATA STORAGE SERVER FOR SELECTIVE STORING OF DATA

(71) Applicant: HUAWEI TECHNOLOGIES CO., LTD., Shenzhen (CN)

(72) Inventors: Eli Shemer, Bnei Berak (IL); Shay Akirav, Bnei Berak (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/172,118

(22) Filed: Feb. 21, 2023

(65) Prior Publication Data

US 2023/0229674 A1    Jul. 20, 2023

Related U.S. Application Data

(63) Continuation of application No. PCT/EP2020/073145, filed on Aug. 19, 2020.

(51) Int. Cl.
*G06F 16/28* (2019.01)
*G06F 16/22* (2019.01)
*G06F 16/2457* (2019.01)

(52) U.S. Cl.
CPC ........ *G06F 16/284* (2019.01); *G06F 16/2282* (2019.01); *G06F 16/24573* (2019.01)

(58) Field of Classification Search
CPC ............... G06F 16/284; G06F 16/2282; G06F 16/24573
See application file for complete search history.

(56) References Cited

U.S. PATENT DOCUMENTS

| | | | |
|---|---|---|---|
| 9,953,103 B2* | 4/2018 | Khaladkar | G06F 16/84 |
| 2016/0092510 A1* | 3/2016 | Samantaray | G06F 16/2455 707/718 |
| 2016/0350308 A1* | 12/2016 | Marcotte | G06F 16/248 |
| 2018/0075262 A1* | 3/2018 | Auh | H04L 9/14 |
| 2018/0132015 A1* | 5/2018 | Borrelli | G06F 11/3006 |
| 2018/0287634 A1* | 10/2018 | Rom | H03M 13/3715 |
| 2019/0005248 A1 | 1/2019 | Krishnamurthy et al. | |
| 2019/0258630 A1* | 8/2019 | Demir | G06F 16/282 |
| 2019/0286837 A1 | 9/2019 | Yim et al. | |
| 2019/0332606 A1* | 10/2019 | Kee | G06F 16/254 |
| 2020/0301941 A1* | 9/2020 | Wilson | G06F 16/252 |
| 2020/0372015 A1* | 11/2020 | Baird, III | H04L 9/14 |
| 2021/0303569 A1* | 9/2021 | Morganstern | G06F 40/154 |

* cited by examiner

*Primary Examiner* — Dangelino N Gortayo
(74) *Attorney, Agent, or Firm* — Leydig, Voit & Mayer, Ltd.

(57) ABSTRACT

A client device for storing a data set in a database is provided. The data set includes a plurality of initial data elements. The client device is configured to determine a storage location of the database for each initial data element and to obtain storage location configuration information based on the storage location. The client device is further configured to process, based on the storage location configuration information, each initial data element of a first subset of the plurality of initial data elements into a processed data element using one or more data processing operations and to transmit a modified data set to a data storage server for storing the modified data set in the database, wherein the modified data set comprises the processed data elements in the first subset and unprocessed initial data elements in a second subset which is complementary to the first subset.

21 Claims, 7 Drawing Sheets

CLIENT DEVICES AND DATA STORAGE SERVER FOR SELECTIVE STORING OF DATA

CROSS-REFERENCE TO RELATED APPLICATIONS

This application is a continuation of International Application No. PCT/EP2020/073145, filed on Aug. 19, 2020, the disclosure of which is hereby incorporated by reference in its entirety.

TECHNICAL FIELD

Embodiments of the present disclosure relate to data storage systems. More specifically, embodiments of the present disclosure relate to client devices and a data storage server for selective storing of data.

BACKGROUND

Remote data storage, such as cloud data storage, is becoming more and more popular, because it allows user client devices, which can usually store only a limited amount of data, to save data and files in one or more remote data storage servers that can be accessed either through the public internet or a dedicated private network connection. A data storage provider hosts, secures, manages, and maintains the data storage servers and the associated infrastructure and ensures the access of the user client devices to the data. One of the main advantages of cloud storage is that the user data may be recovered from the remote data storage servers when the data has been removed, corrupted, or otherwise becomes inaccessible on the user client device.

SUMMARY

It is therefore an objective of the present disclosure to provide an improved client device and an improved data storage server for data storage.

The foregoing and other objectives are achieved by the subject matter of the independent claims. Further implementation forms are apparent from the dependent claims, the description and the figures.

According to a first aspect, a client device for storing a data set, including a plurality of initial data elements, in a database of a data storage server is provided. The client device comprises a communication interface configured to communicate with the data storage server and a processing circuitry configured, for each of the plurality of initial data elements, to determine a storage location of the database for the initial data element and to obtain storage location configuration information based on the storage location. For each initial data element of a first subset of the plurality of initial data elements, the storage location configuration information is indicative of one or more data processing operations for processing the respective initial data element into a processed data element. The processing circuitry is further configured, for each initial data element of the first subset of the plurality of initial data elements, to process the respective initial data element into the processed data element using the one or more data processing operations. The communication interface is further configured to transmit a modified data set to the data storage server for storing the modified data set in the database. The modified data set comprises for the first subset of the plurality of initial data elements the processed data elements and for a second subset of the plurality of initial data elements the initial, i.e. un-processed data elements, wherein the second subset is complementary to the first subset of the plurality of initial data elements. As used herein, complementary means that the first subset of the plurality of initial data elements and the second subset of the plurality of initial data elements together form the data set.

The client device may be one of a plurality of client devices configured to store data in the database of the data storage server in this way. Thus, advantageously, the client device(s) and the data storage server allow implementing a data storing framework with selective processing of the data in that by means of the storage location configuration information one or more data operations may be defined for some of the data storage locations of the database to be applied to the respective data by the client device(s) before being stored in the database, while for the rest of the data storage locations of the database no data operations are applied to the data. Thus, based on the storage location configuration information the client device(s) may apply different or the same data operations for different data storage locations of the database.

In a further possible implementation form of the first aspect, the client device further comprises a cache memory configured to store the storage location configuration information, wherein the processing circuitry is configured to obtain the storage location configuration information from the memory.

In a further possible implementation form of the first aspect, the processing circuitry is configured to obtain the storage location configuration information via the communication interface from the data storage server.

In a further possible implementation form of the first aspect, the database is a relational database, i.e. a database storing data in a plurality of tables, wherein the processing circuitry is configured, for each of the plurality of initial data elements, to determine a column of a table of the relational database for determining the storage location of the relational database for the initial data element.

In a further possible implementation form of the first aspect, the data set defines a new row of a table of the relational database.

In a further possible implementation form of the first aspect, the processing circuitry is configured, for each of the plurality of initial data elements, to determine the storage location of the database for the initial data element by determining a column identifier for the initial data element.

In a further possible implementation form of the first aspect, the processing circuitry is further configured, for each initial data element of the first subset of the plurality of initial data elements, to adjust the storage location configuration information for each initial data element based on a global database configuration information.

In a further possible implementation form of the first aspect, the processing circuitry is further configured, for each initial data element of the first subset of the plurality of initial data elements, to process the respective initial data element into the processed data element using the one or more data processing operations by at least partially transforming the initial data element using one or more data transformation operations. In an implementation form, the one or more data transformation operations may including a compression operation for compressing the initial data element, and/or an encryption operation for encrypting the initial data element.

In a further possible implementation form of the first aspect, the processing circuitry is further configured, for each initial data element of the first subset of the plurality of initial data elements, to process the respective initial data element into the processed data element using the one or more data processing operations by adding metadata to the initial data element.

In a further possible implementation form of the first aspect, the processing circuitry is further configured to execute an application, wherein the application is configured to generate the data set to be stored in the database of the data storage server and to request storage of the data set in the database using a first type of data query comprising the data set, and wherein the processing circuitry is further configured to replace the initial data elements of the first subset of the plurality of initial data elements in the first type of data query with the processed data elements.

In a further possible implementation form of the first aspect, the processing circuitry is further configured to retrieve a further data set from the database in response to a second type of data query from the application, wherein the further data set comprises a further first subset of processed data elements and a further second subset of initial data elements, wherein the further first subset of processed data elements is complementary to the further second subset of initial data elements and wherein the processed further data elements of the first subset of processed data elements are based on one or more further data processing operations, and wherein the processing circuitry is further configured to transform, i.e. de-process the processed data elements of the first subset of processed data elements based on the one or more further data processing operations into a further first subset of initial data elements.

In a further possible implementation form of the first aspect, the second type of data query comprises a query command for retrieving the further data set from the database, in particular a select query.

According to a second aspect a method for storing a data set, including a plurality of initial data elements, in a database of a data storage server is provided. The method comprises the steps of:
  determining, for each of the plurality of initial data elements, a storage location of the database for the initial data element;
  obtaining storage location configuration information based on the storage location, wherein, for each initial data element of a first subset of the plurality of initial data elements, the storage location configuration information is indicative of one or more data processing operations for processing the initial data element into a processed data element;
  processing, for each initial data element of the first subset of the plurality of initial data elements, the initial data element into the processed data element using the one or more data processing operations; and
  transmitting a modified data set to the data storage server for storing the modified data set in the database, wherein the modified data set comprises for the first subset of the plurality of initial data elements the processed data elements and for a second subset of the plurality of initial data elements the initial data elements, wherein the second subset is complementary to the first subset of the plurality of initial data elements.

The method according to the second aspect of the present disclosure can be performed by the client device according to the first aspect of the present disclosure. Thus, further features of the method according to the second aspect of the present disclosure result directly from the functionality of the client device according to the first aspect of the present disclosure as well as its different implementation forms described above and below.

According to a third aspect a data storage server for operating a database is provided. The data storage server comprises a communication interface configured to receive a data set from a client device, wherein the data set comprises a first subset of processed data elements and a second subset of initial data elements. Moreover, the data storage server comprises a processing circuitry configured to store each of the processed data elements and each of the initial data elements of the data set in a respective storage location of the database.

In a further possible implementation form of the third aspect, the communication interface is further configured to transmit, for each processed data element and for each initial data element, storage location configuration information based on the storage location to the client device, wherein, for each processed data element, the storage location configuration information is indicative of one or more data processing operations used for generating the processed data element.

In a further possible implementation form of the third aspect, the one or more data processing operations comprise at least partially transforming an initial data element using one or more data transformation operations. In an implementation form, the one or more data transformation operations comprise a compression operation for compressing an initial data element, and/or an encryption operation for encrypting an initial data element In a further possible implementation form of the third aspect, the one or more data processing operations comprise adding metadata to an initial data element for generating the processed data element.

In a further possible implementation form of the third aspect, the processing circuitry is configured to provide, in response to a data request query from the client device, a further data set from the database to the client device, wherein the further data set comprises a further first subset of processed data elements and a further second subset of initial data elements, wherein the further first subset of processed data elements is complementary to the further second subset of initial data elements and wherein the processed further data elements of the first subset of processed data elements are based on one or more further data processing operations.

In a further possible implementation form of the third aspect, the database is a relational database and the respective storage location is a respective column of a table of the relational database.

In a further possible implementation form of the third aspect, the processing circuitry is configured to store the data set in one or more rows of a table of the relational database.

According to a fourth aspect a method of operating a database of a data storage server is provided. The method comprises the steps of:
  receiving a data set from a client device, wherein the data set comprises a first subset of processed data elements and a second subset of initial data elements; and
  storing each of the processed data elements and each of the initial data elements of the data set in a respective storage location of the database.

The method according to the fourth aspect of the present disclosure can be performed by the data storage server according to the third aspect of the present disclosure. Thus, further features of the method according to the fourth aspect of the present disclosure result directly from the functionality of the data storage server according to the third aspect of the present disclosure as well as its different implementation forms described above and below.

According to a fifth aspect, a computer program product comprising a non-transitory computer-readable storage medium for storing program code which causes a computer or a processor to perform the method according to the second aspect or the method according to the fourth aspect, when the program code is executed by the computer or the processor, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
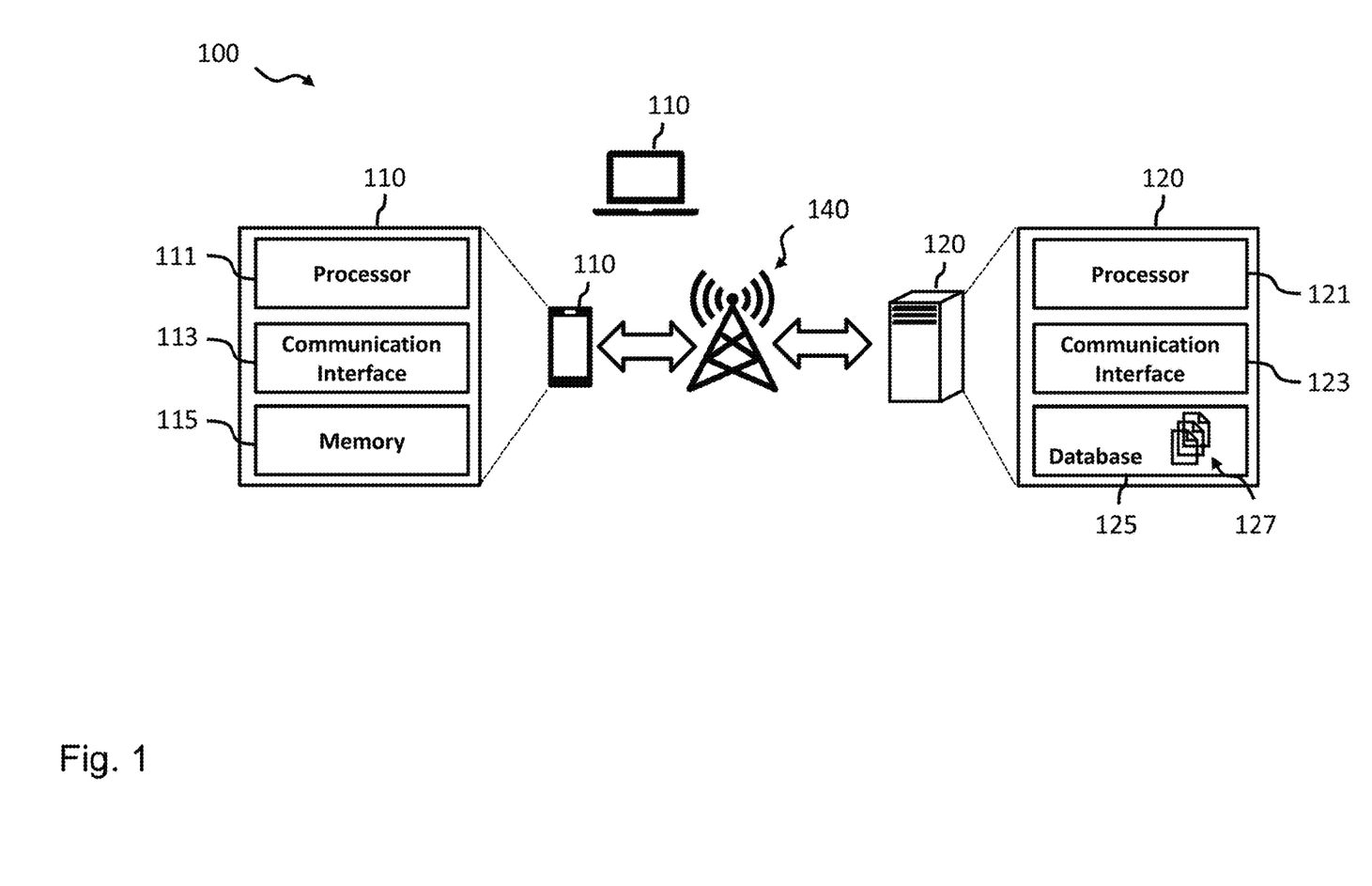
FIG. 1 is a schematic diagram illustrating a data storage system according to an embodiment, including a plurality of client devices according an embodiment and a data storage server operating a database according to an embodiment.

FIG. 1 is a schematic diagram illustrating a data storage system 100, for instance, a cloud storage system 100 according to an embodiment. As will be described in more detail below, the data storage system 100 comprises a plurality of client or user devices 110, such as smart phones, tablet computers, laptop computers, desktop computers or other types of IoT devices, as well as one or more remote data storage servers 120 operating a database 125. As illustrated in FIG. 1, the plurality of client devices 110 and the one or more remote data storage servers 120 may be configured to communicate with each other via a wireless, e.g. cellular and/or wired communication network 140. In an embodiment, the one or more remote data storage servers 120 may be one or more cloud storage servers 120 configured to communicate with the client devices 110 via the Internet.

As illustrated in FIG. 1, the client device 110 may comprise a processor or another type of processing circuitry 111 for processing and generating data, a communication interface 113, including, for instance, an antenna, for exchanging data with the other components of the cloud storage system 100, and a non-transitory memory 115 for storing data. The processor 111 of the client device 110 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The non-transitory memory 115 may store data, such as electronic keys and executable program code which, when executed by the processor 111, causes the client device 110 to perform the functions, operations and methods described herein. The communication interface 113 may comprise a wired or wireless communication interface 113. Likewise, the data storage server 120 may comprise a processor 121 for processing and generating data, a communication interface 123 for exchanging data with the other components of the data storage system 100 as well as the database 125 for storing data.

As will be described in more detail below, for storing a data set, including a plurality of initial data elements, in the database 125 of the data storage server 120, the processor 111 of the client device 110 is configured, for each of the plurality of initial data elements of the data set, to determine a storage location within the database 125 of the data storage server 120 and, based on the determined storage location of each initial data element of the data set, obtain storage location configuration information for the respective initial data element. As used herein, the storage location configuration information is indicative of one or more data processing operations for processing the respective initial data element into a processed data element. In other words, based on the storage location configuration information, the processor 111 of the client device 110 can determine whether one or more data operations identified by the storage location configuration information should be applied to the respective initial data element (for obtaining a processed data element) or not before being transmitted to the data storage server 120. In doing so, the processor 111 of the client device 110 may determine, based on the respective storage location configuration information, that a for a first subset of the plurality of initial data elements of the data set one or more data operations are to be applied to these data elements (thereby obtaining a modified data set with a first subset of processed data elements), while for a second subset of the plurality of initial data elements of the data set (complementary to the first subset of the plurality of initial data elements) no data operations are to be applied to these initial data elements. In other words, based on the respective storage location configuration information, the processor 111 of the client device 110 may generate a modified data set, wherein the first subset of the modified data set comprises the processed data elements, while the second subset of the modified data set comprises the initial, i.e. un-processed data elements. This modified data set is transmitted by the communication interface 113 of the client device 110 to the data storage server 120.

Figure 2:
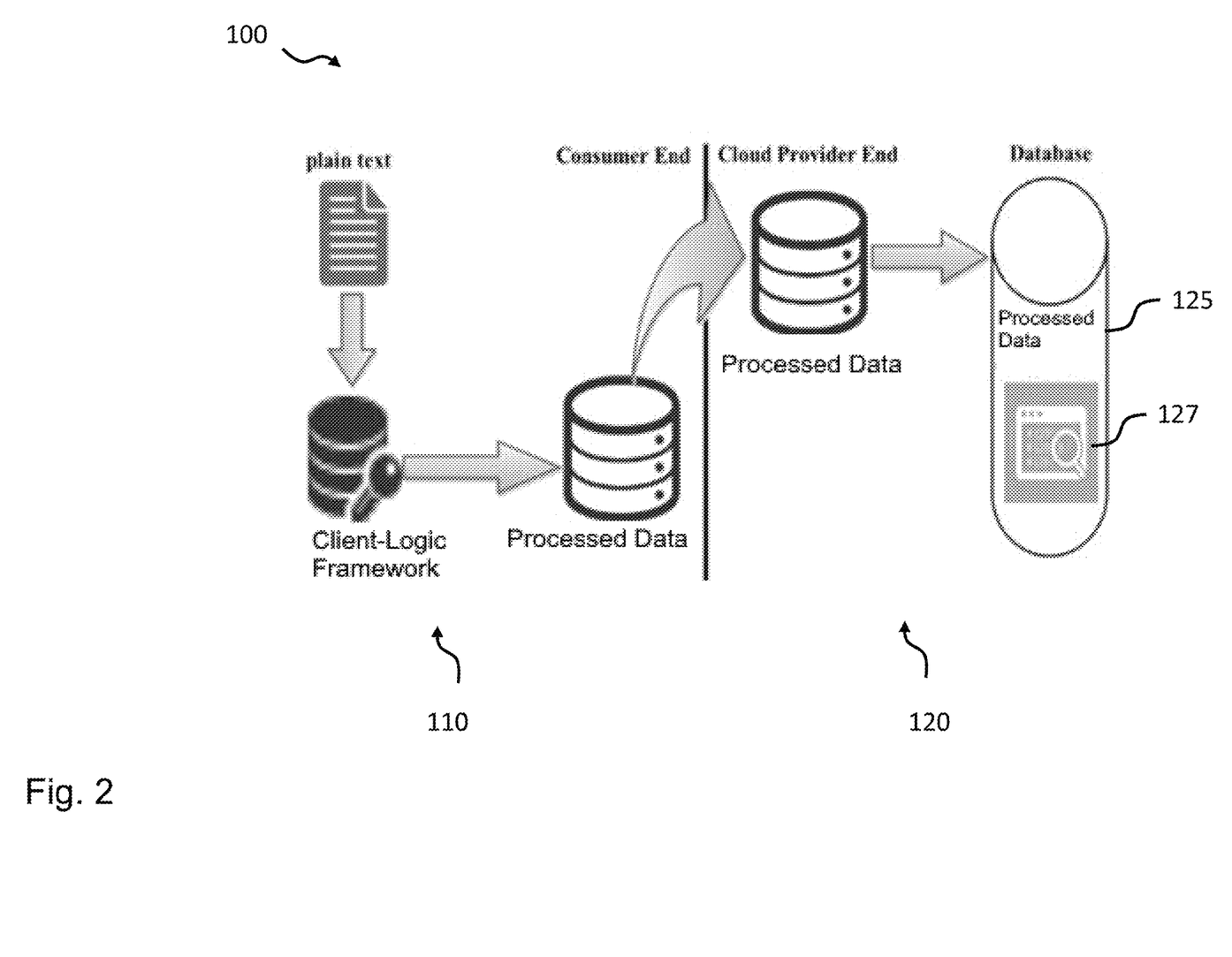
FIG. 2 is a schematic diagram illustrating an aspect of a data storage system according to an embodiment, including a client device according an embodiment and a data storage server operating a database according to an embodiment.

After the modified data set, including the first subset of processed data elements and the second complementary set of initial, i.e. un-processed data elements, has been received by the communication interface 123 of the data storage server 120, the processor 121 of the data storage server 120 may store the modified data set in the database 125. This procedure implemented by the client device 110 and the data storage server 120 is also illustrated in FIG. 2. On the side of the client device 110, data, which may originate from a client application 111a running on the client device 110, is selectively processed using one or more data operations identified by the storage location configuration information, i.e. some data is processed, while some data remains unprocessed (converting the application data to its binary format may be required before processing). On the side of the data storage server 120 the processed data as well as the un-processed data is stored in the designated location of the database 125.

In the following detailed embodiments of the client device 110 and the data storage server 120 will be described, where the database 125 is implemented as a relational database 125, for instance, a SQL based relational database 125. In these embodiments, as will be described in more detail below the data storage server 120 is configured to store data in one or more columns of one or more tables of the relational database 125. It will be appreciated, however, that the data storage server 120 may comprise a non-relational database 125 and the client device 110 may be configured to operate therewith, wherein the data are stored in a data structure other than a table. For instance, in an embodiment, the database 125 may be implemented as a MongoDB database 125. For such an embodiment, the data storage server 120 may be configured to store the data in one or more fields of the MongoDB database 125.

Figure 3:
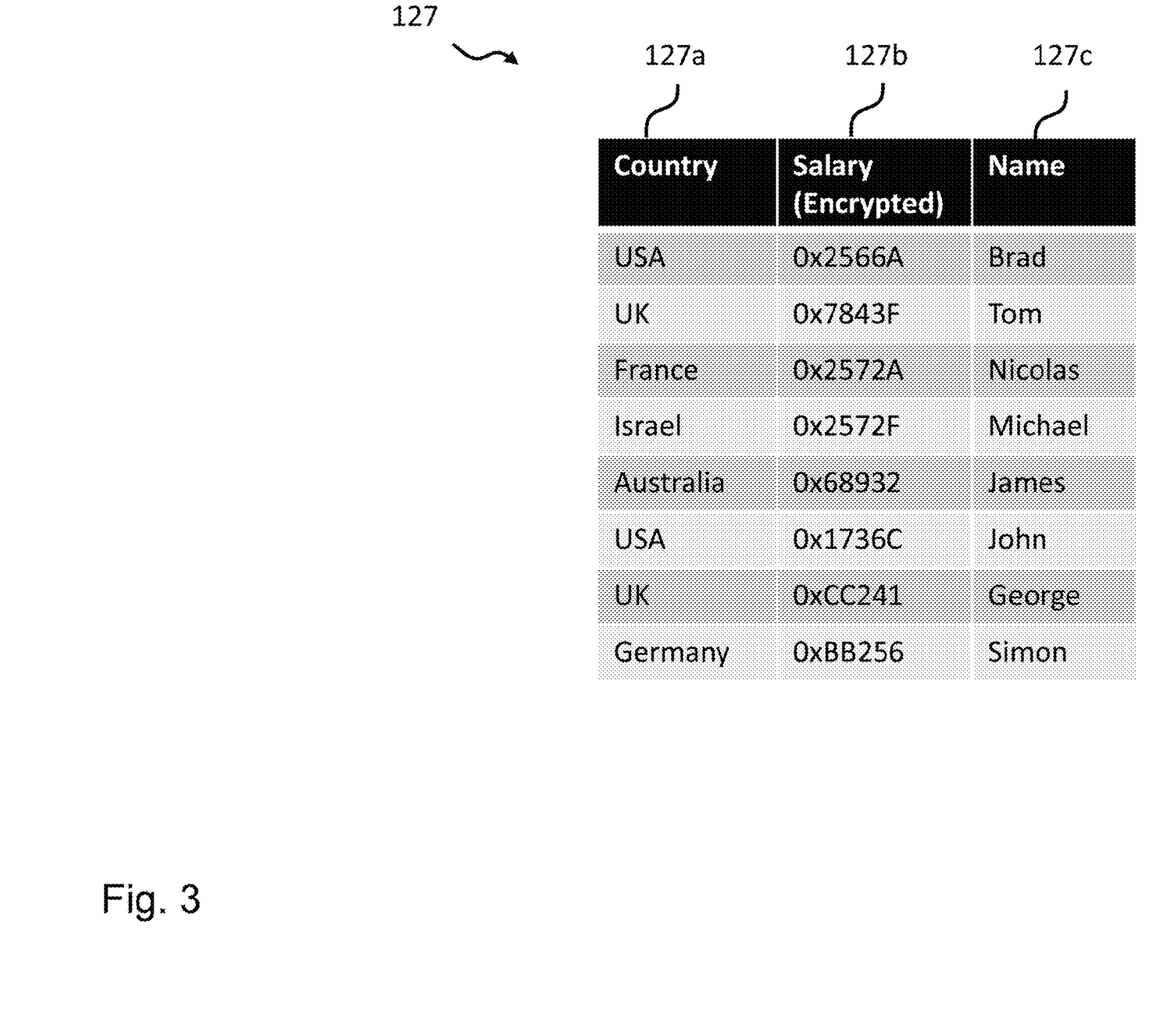
FIG. 3 illustrates an exemplary table used by a client device according to an embodiment and a data storage server according to an embodiment for selectively storing of data.

As already described above, the database 125 may be implemented as a relational database 125, for instance, a SQL based relational database 125. FIG. 3 shows an example of a table 127 of the relational database 125 comprising two columns 127a and 127c for storing the initial, un-processed data as well as one column 127b for storing data processed by the processor 111 of the client device 110. For the exemplary table 127 shown in FIG. 3, the storage location configuration information may contain for each column 127a-c of the table a setting or flag (such as 0 or 1) indicating whether the data to be stored in the respective column of the table 127 is to be processed by the one or more data operations or not. Moreover, the storage location configuration information identifies the one or more data operations, which in the example shown in FIG. 3 is, by way of example, an encryption operation. Thus, for the exemplary table 127 shown in FIG. 3 the processor 111 of the client device 110 determines that the data to be stored in columns 127a, 127c should not be processed using the encryption operation, while the data to be stored in column 127b should be processed using the encryption operation, i.e. encrypted. For instance, in case a data set {Sweden, 5000, Sven} is to be added to the table 127 of FIG. 3, the processor 111 of the client device 110 would, based on the storage location configuration information, not process the data elements {Sweden} and {Sven} and encrypt the data element {5000} into the processed data element {0x2434D} and, thereafter, transmit the modified data set {Sweden, 0x2434D, Sven} to the data storage server 120 for storing the modified data set {Sweden, 0x2434D, Sven} as a new row of the table 127 shown in FIG. 3.

In an embodiment, the storage location configuration information for identifying the columns of the relational database 125 storing processed data may be stored in the memory 115 of the client device 110. In a further embodiment, the client device 110 may be configured to obtain the storage location configuration information from the data storage server 120. In an embodiment, the storage location configuration information may comprise one or more metadata or catalogue tables. In an embodiment, such a metadata table could represent every column of the relational database 125 storing processed data using a first value, such as "1", while representing every column 127a, 127c of the relational database 125 storing un-processed data with a second value different from the first value, such as "0". Alternatively or additionally, the storage location configuration information may comprise a list of the columns of the relational database storing processed data as well as the respective data operations. Multiple columns may share the same storage location configuration information.

In an embodiment, the processing circuitry 111 of the client device 110 is configured, for each of the plurality of initial data elements, to determine the storage location of the database 125 for each initial data element by determining a column identifier for the initial data element.

In an embodiment, the processing circuitry 111 of the client device 110 is further configured, for each initial data element of the first subset of the plurality of initial data elements, to process the respective initial data element into the processed data element using the one or more data processing operations by at least partially transforming the respective initial data element using one or more data transformation operations. In an embodiment, the one or more data transformation operations may comprise a data compression operation for compressing the initial data element into a compressed data element, and/or an encryption operation for encrypting the initial data element (as already described in the context of the exemplary table 127 shown in FIG. 3). For instance, in an embodiment, some of the initial data elements may be image files and the data transformation operation may be to reduce the resolution of the respective image. In further embodiments, the one or more data transformation operations defined by the respective storage location configuration information may comprise other data transformation operations that reduce (or increase) a "quality measure" of the respective initial data element, such as reducing the sampling rate of a sound file. In a further embodiment, the one or more data operations to process the respective initial data element into the processed data element may comprise adding metadata to the initial data element, such as adding a digital signature or a checksum to the initial data element.

In an embodiment, the processing circuitry 111 of the client device 110 may be further configured, for each initial data element of the first subset of the plurality of initial data elements, to adjust the storage location configuration information for each initial data element based on a global database configuration information. In other words, based on the global database configuration information the processing circuitry 111 of the client device 110 may be configured to adjust the one or more data operations defined by the storage location configuration information for each initial data element. For instance, while the respective storage location configuration information for each initial data element may define a compression operation with a certain compression level for each initial data element, the global database configuration information may require a minimum compression level under certain requirements.

As described above, the storage location configuration information identifies which data fields, i.e. storage locations of the database 125 are to be processed by the client device 110 before being transmitted to the data storage server 120. According to an embodiment, the storage location configuration information may be generated, for instance, by the data storage server 120 during table creation or when adding a new column to an existing table. The embodiments disclosed herein can be easily enabled for creating new tables of the database 125. For instance, during creation of a new table the specific columns for storing the processed data as well as the one or more data operations for processing the data may be identified.

In an embodiment, a minimized version of a parser of the database 125 may be integrated into the client device 110. The client device 110 may use the parser to build a syntax tree for any data queries. Based on the analysis of the syntax tree, the client device 110 may extract the data elements to be processed from the query and replace these data elements with the processed data elements. Furthermore, the client device 110 may be configured to convert the data from human-readable form to binary form before processing, and from binary form to a human-readable format after deprocessing. Applications may request to receive the data in binary form, no format conversion is thus necessary.

Figure 4:
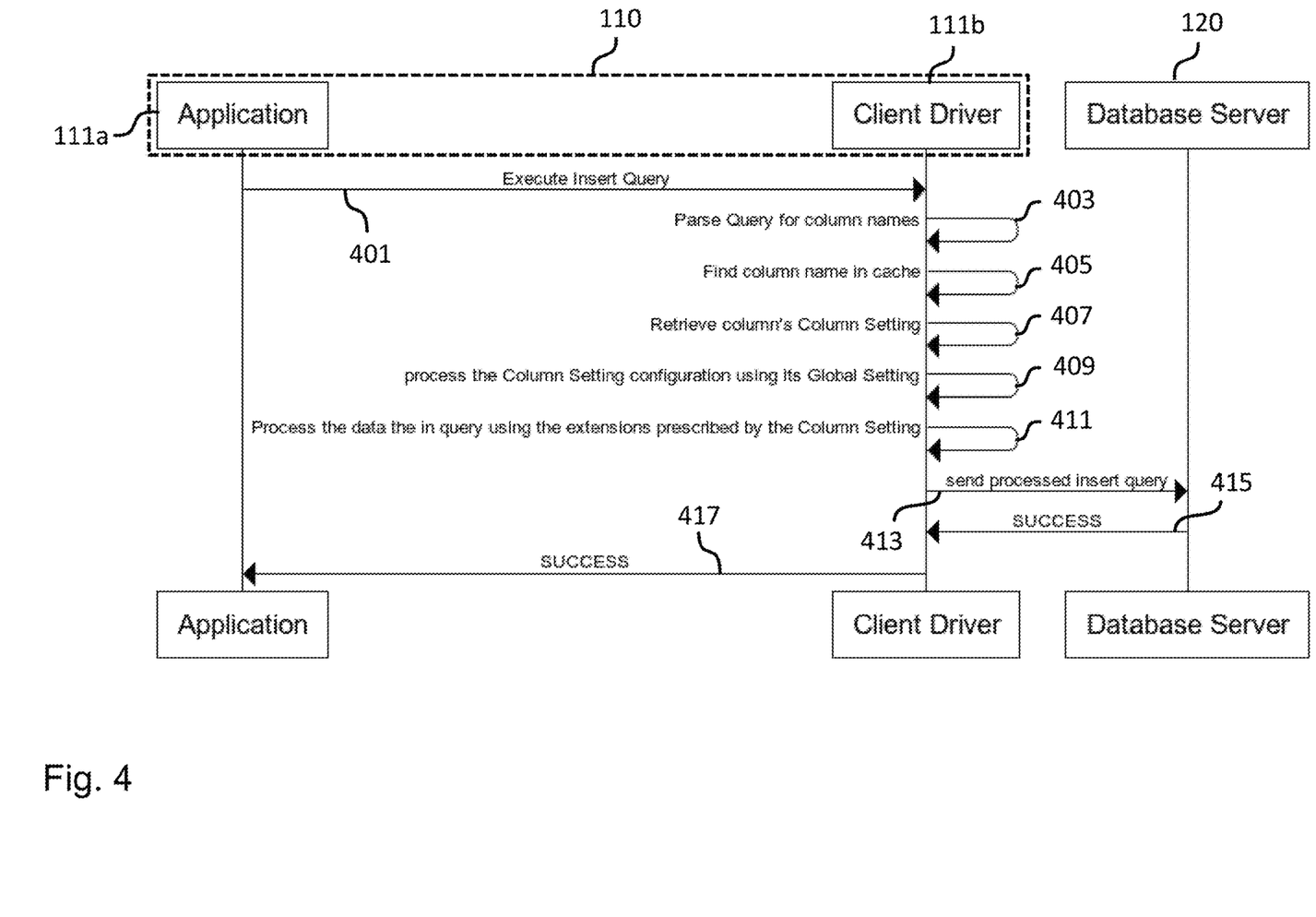
FIG. 4 is a sequence diagram illustrating interactions between a client device according to an embodiment and a data storage server according to an embodiment for selectively storing data in the database of the data storage server.

FIG. 4 shows in more detail a sequence of steps illustrating the interactions between the client device 110 according to an embodiment and the data storage server 120 (referred to as database server 120) according to an embodiment for selectively storing a new data set in the database 125, including the following steps:

Step 401: An application 111*a* running on the processor 111 of the client device 110 informs a client driver 111*b* (which may also be a software executed by the processor 111 of the client device 110) to execute a query to insert a new data set in the relational database 125 of the data storage server 120. In an embodiment, the application 111*a* executes an INSERT SQL statement intended for adding a row to a table of the database 125.

Step 403: In response to step 401, the client driver 111*b* parses the SQL query from the application 111*a* for the column names associated with the initial data elements of the new data set to be stored in the relational database 125 of the remote data storage server 120.

Step 405: The client driver 111*b* identifies the column names stored in the cache memory 115 of the client device 110 on the basis of the parsed query.

Step 407: Based on the column names identified in the previous steps, the client driver 111*b* retrieves the column settings (i.e. the storage location configuration information) for determining whether the respective data has to be processed and, if this is the case, by means of which data operation. The storage location configuration information may be stored in the memory 115 of the client device 110.

Step 409: The client driver 111*b* may further check whether some global database configuration information overwrites the different column settings, i.e. the different storage location configuration information. The global database configuration information may be stored in the memory 115 of the client device 110.

Step 411: The client driver 111*b* processes the initial data elements identified by the column settings with the data operation(s) identified by the column settings (while taking account of the global database configuration information).

Step 413: The client driver 111*b* sends the processed data elements and the initial, un-processed data elements to the data storage server 120 using the processed insert query.

Step 415: The data storage server 120 acknowledges the successful storage of the processed data elements and the initial, un-processed data elements in the database 125 to the client driver 111*b* of the client device 110.

Step 417: The client driver 111*b* acknowledges the successful storage of the processed data elements and the initial, un-processed data elements in the database 125 to the application 111*a* (originally issuing the insert query).

Figure 5:
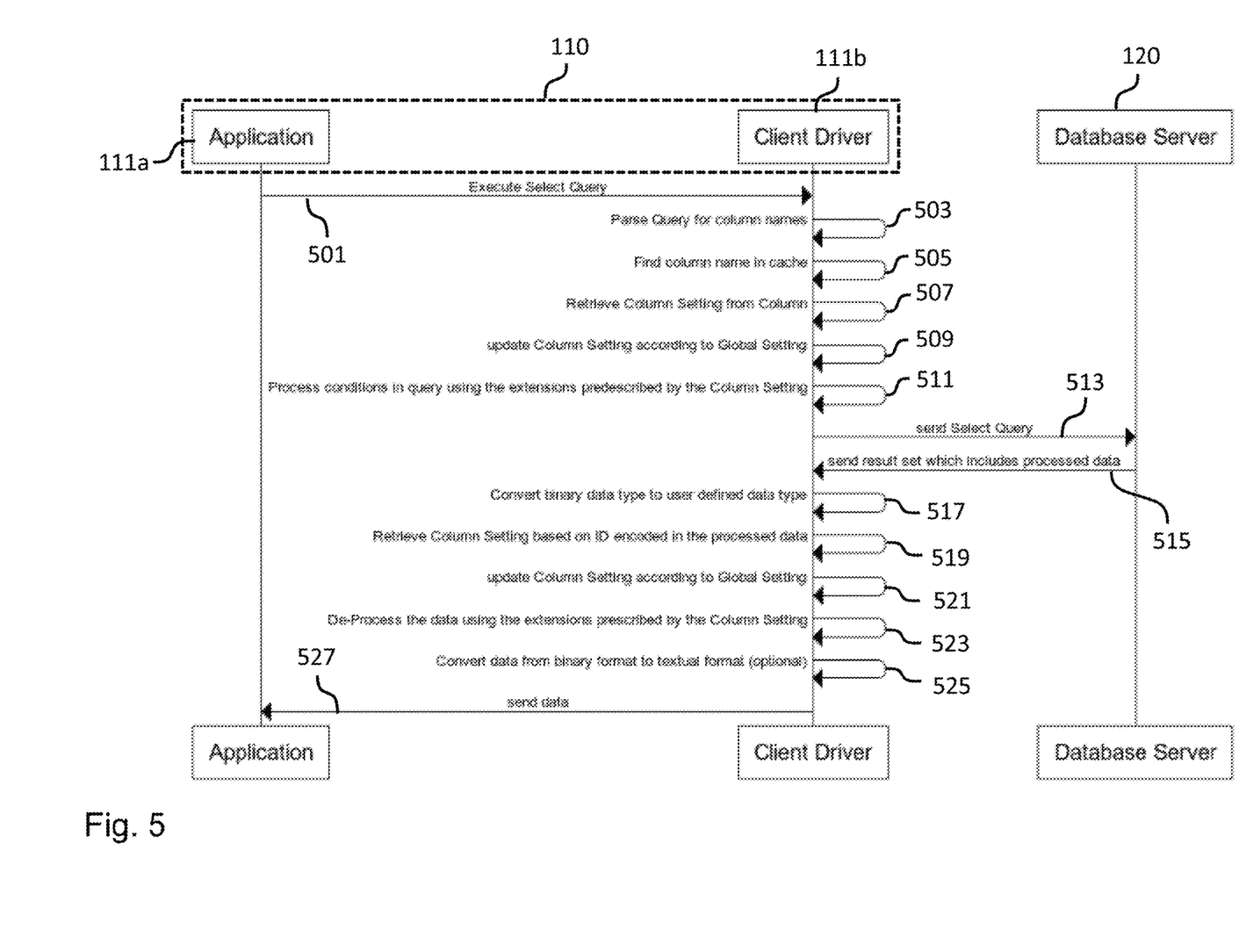
FIG. 5 is a sequence diagram illustrating interactions between a client device according to an embodiment and a data storage server according to an embodiment for retrieving selectively stored data from the database of the data storage server.

FIG. 5 is a sequence diagram illustrating interactions between the client device 110 according to an embodiment and the data storage server 120 according to an embodiment for retrieving selectively stored data from the database 125 (using a "select query."), including the following steps:

Step 501: The application 111*a* running on the processor 111 of the client device 110 informs the client driver 111*b* to execute a select query to retrieve one or more data sets from the relational database 125 of the data storage server 120 (meeting some search conditions defined in the select query).

Step 503: In response to step 501, the client driver 111*b* parses the query from the application 111*a* for the column names associated with the data elements of the searched data set(s) to be retrieved from the relational database 125 of the remote data storage server 120.

Step 505: The client driver 111*b* identifies the column names stored in the cache memory 115 of the client device 110 on the basis of the parsed query.

Step 507: Based on the column names identified in the previous steps, the client driver 111*b* retrieves the column settings (i.e. the storage location configuration information) for determining whether the respective data has been stored in processed form and, if this is the case, by means of which data operation.

Step 509: The client driver 111*b* may further check whether some global database configuration information overwrites the different column settings i.e. the different storage location configuration information.

Step 511: The client driver 111*b* processes the search conditions for the data identified by the column settings with the data operation(s) identified by the column settings (while taking account of the global database configuration information).

Step 513: The client driver 111b sends the select query along with the processed search conditions and the un-processed search conditions to the data storage server 120.

Step 515: The data storage server 120 searches the database 125 using the processed search conditions and the un-processed search conditions and returns the data set(s) found to the client driver 111b of the client device 110.

Step 517: The client driver 111b converts the data set(s) received from the data storage server 120 from a data storage server data type to a client device data type.

Step 519. Based on an identifier encoded in the processed data the client driver 111b may obtain the column settings, i.e. the storage location configuration information for this processed data.

Step 521: The client driver 111b may further check whether some global database configuration information overwrites the column setting obtained in the previous step.

Step 523: The client driver 111b de-processes (i.e. applies the inverse data operation to) the processed data with the data operation(s) identified by the column settings (while taking account of the global database configuration information).

Step 525: The client driver 111b of the client device 110 may convert the data set(s) from a machine readable binary format into a human readable textual format.

Step 527: The client driver 111b provides the requested data set(s) to the application 111a.

Figure 6:
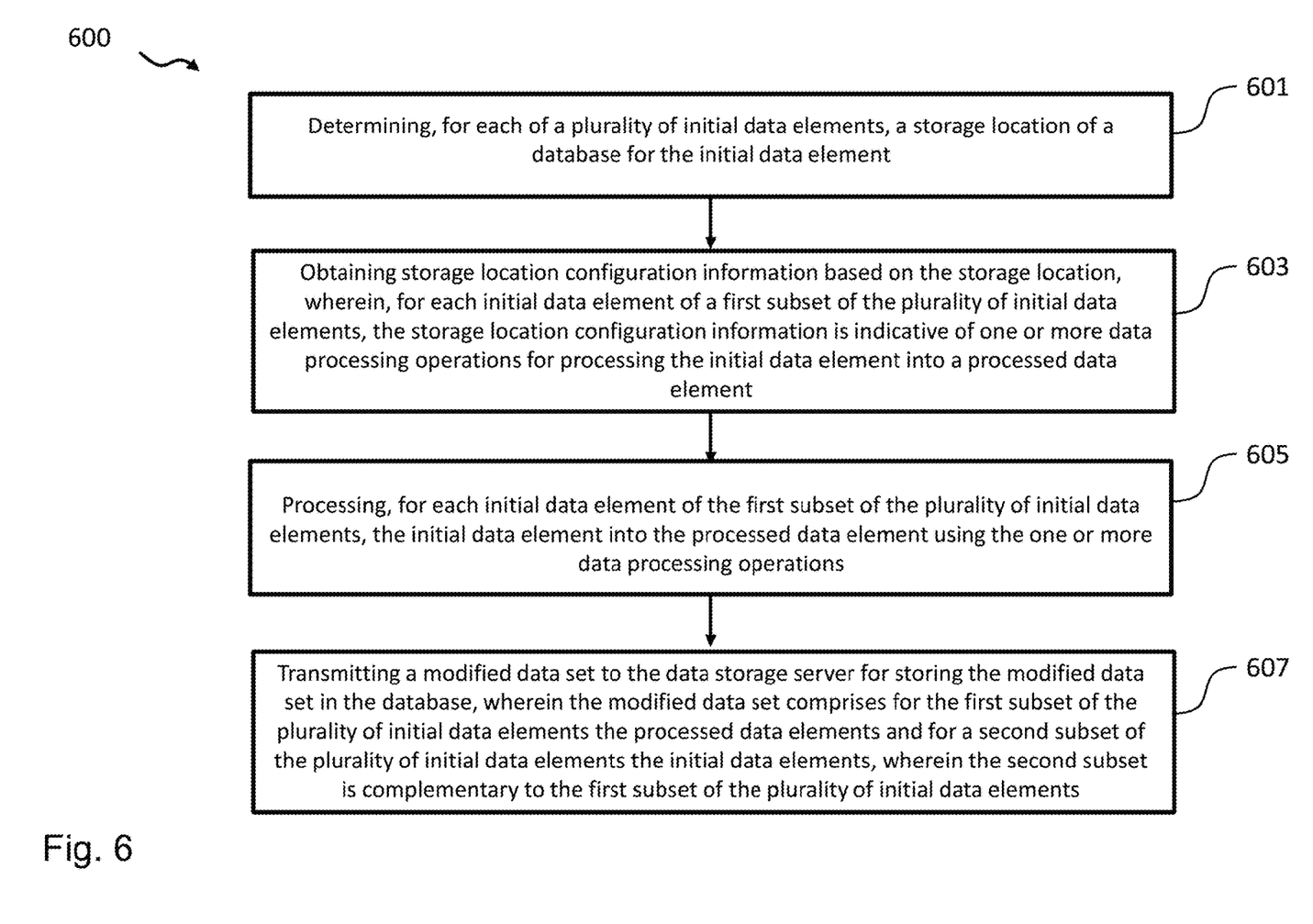
FIG. 6 is a flow diagram illustrating a method for storing data of a client device in a database of a data storage server according to an embodiment.

FIG. 6 is a flow diagram illustrating a method 600 for storing data of the client device 110 in the database 125 of the remote data storage server 120 according to an embodiment. The method 600 comprises a step 601 of determining, for each of the plurality of initial data elements, a storage location of the database 125, for instance, a column of a table 127 for the initial data element. Moreover, the method 600 comprises a step 603 of obtaining storage location configuration information based on the storage location, wherein, for each initial data element of a first subset of the plurality of initial data elements, the storage location configuration information is indicative of one or more data processing operations for processing the initial data element into a processed data element. The method 600 comprises the further step 605 of processing, for each initial data element of the first subset of the plurality of initial data elements, the initial data element into the processed data element using the one or more data processing operations. Moreover, the method 600 comprises a step 607 of transmitting a modified data set to the data storage server 120 for storing the modified data set in the database 125. The modified data set comprises for the first subset of the plurality of initial data elements the processed data elements and for a second subset of the plurality of initial data elements the initial data elements, wherein the second subset is complementary to the first subset of the plurality of initial data elements.

Figure 7:
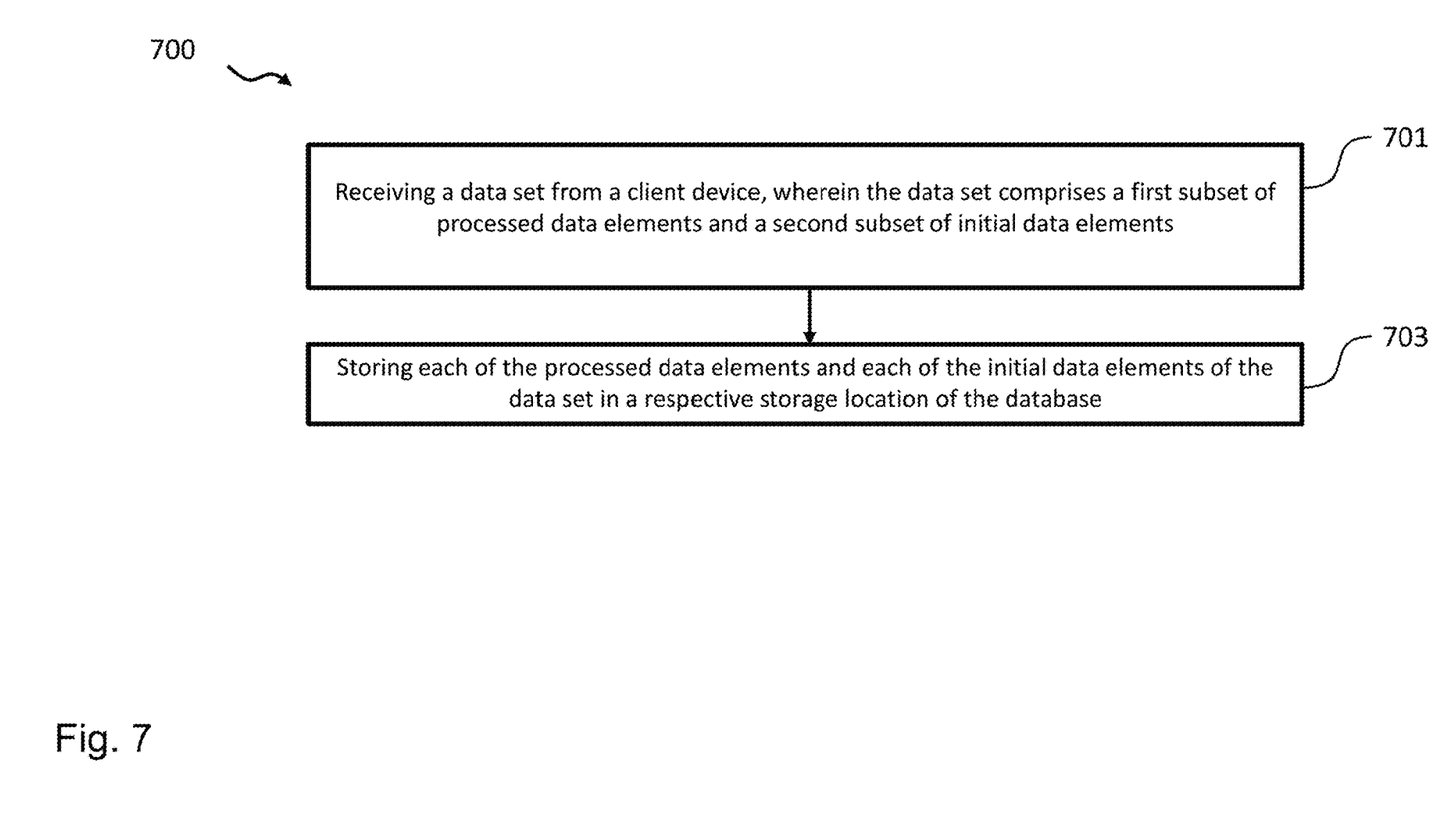
FIG. 7 is a flow diagram illustrating a method of operating a data storage server with a database according to an embodiment.

FIG. 7 is a flow diagram illustrating a method 700 of operating a data storage server 120 with a database 125 according to an embodiment. The method 700 comprises a step 701 of receiving a data set from the client device 110, wherein the data set comprises a first subset of processed data elements and a second subset of initial data elements. Moreover, the method 700 comprises a step 703 of storing each of the processed data elements and each of the initial data elements of the data set in a respective storage location of the database 125.

As already mentioned above, although the above embodiments have been described in the context of a relational database 125, in further embodiments, the data storage server 120 may comprise a non-relational database 125 and the client device 110 may be configured to operate therewith, wherein the data are stored in a data structure other than a table. For instance, in an embodiment, the database 125 may be implemented as a MongoDB database 125. For such an embodiment, the data storage server 120 may be configured to store the data in one or more fields of the MongoDB database 125. When adding a new document, i.e. data to a collection (insert statement), the MongoDB client driver 111a may be configured to detect if a field in the document needs to be processed. The field data may be processed by the client driver 111b as required.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A client device for storing a data set, including a plurality of initial data elements, in a database of a data storage server, the client device comprising:
   a communication interface configured to communicate with the data storage server; and
   a processing circuitry configured, for each of the plurality of initial data elements, to determine a storage location of the database for each initial data element, and to obtain storage location configuration information from the data storage server based on the storage location, wherein, for each initial data element of a first subset of the plurality of initial data elements, the storage location configuration information is indicative of one or more data processing operations for processing the respective initial data element into a processed data element: based on a flag setting with a value of 1 or 0 indicated the storage location configuration information, the processing circuitry is configured to determine whether to apply the one or more data processing operations to the respective initial data element to obtain a modified data set including processed data elements and unprocessed initial data elements before transmitting the modified data set to the data storage server;

wherein the processing circuitry is further configured, for each initial data element of the first subset of the plurality of initial data elements, to process the respective initial data element into the processed data element using the one or more data processing operations by performing one or more transformation operations on at least a part of data included in the initial data element without processing the remaining data of the initial data element as indicated by the storage location configuration information, and the one or more transformation operations include a data compression operation and/or an encryption operation, and wherein the communication interface is configured to transmit the modified data set to the data storage server for storing the modified data set in the database, wherein the modified data set comprises the processed data elements included in the first subset and the unprocessed initial data elements included in a second subset of the plurality of initial data elements, wherein the first subset of the plurality of initial data elements and the second subset of the plurality of initial data elements together form the modified data set;

wherein the processing circuitry is further configured to convert the initial data elements from human-readable form to binary form before processing; and obtain the storage location configuration information via the communication interface from the data storage server.

2. The client device of claim 1, wherein the client device further comprises a memory configured to store the storage location configuration information, and wherein the processing circuitry is configured to obtain the storage location configuration information from the memory.

3. The client device of claim 1, wherein the database is a relational database, and wherein the processing circuitry is configured, for each of the plurality of initial data elements, to determine a column of a table of the relational database for determining the storage location of the relational database for the initial data element.

4. The client device of claim 3, wherein the data set defines a new row of the table of the relational database.

5. The client device of claim 3, wherein the processing circuitry is configured, for each of the plurality of initial data elements, to determine the storage location of the relational database for the initial data element by determining a column identifier for the initial data element.

6. The client device of claim 1, wherein the processing circuitry is further configured, for each initial data element of the first subset of the plurality of initial data elements, to adjust the storage location configuration information for each initial data element based on a global database configuration information.

7. The client device of claim 1, wherein the processing circuitry is further configured, for each initial data element of the first subset of the plurality of initial data elements, to process the initial data element into the processed data element using the one or more data processing operations by adding metadata to the initial data element.

8. The client device of claim 1, wherein the processing circuitry is further configured to execute an application, wherein the application is configured to generate the data set to be stored in the database of the data storage server and to request storage of the data set in the database using a first type of data query comprising the data set, and wherein the processing circuitry is further configured to replace the initial data elements of the first subset of the plurality of initial data elements in the first type of data query with the processed data elements.

9. The client device of claim 8, wherein the processing circuitry is further configured to retrieve a further data set from the database in response to a second type of data query from the application, wherein the further data set comprises a further first subset of processed data elements and a further second subset of initial data elements, wherein the further first subset of processed data elements is complementary to the further second subset of initial data elements and wherein the processed further data elements of the first subset of processed data elements are based on one or more further data processing operations, and wherein the processing circuitry is further configured to transform the processed data elements of the first subset of processed data elements based on the one or more further data processing operations into a further first subset of initial data elements.

10. The client device of claim 9, wherein the second type of data query comprises a query command for retrieving the further data set from the database.

11. A method for storing a data set, including a plurality of initial data elements, in a database of a data storage server, wherein the method is implemented by a client device and comprises:

determining, for each of the plurality of initial data elements, a storage location of the database for the initial data element;

obtaining storage location configuration information from the data storage server based on the storage location, wherein, for each initial data element of a first subset of the plurality of initial data elements, the storage location configuration information is indicative of one or more data processing operations for processing the initial data element into a processed data element: based on a flag setting with a value of 1 or 0 indicated the storage location configuration information, determining whether to apply the one or more data processing operations to the respective initial data element to obtain a modified data set including processed data elements and unprocessed initial data elements before transmitting the modified data set to the data storage server;

processing, for each initial data element of the first subset of the plurality of initial data elements, the initial data element into the processed data element using the one or more data processing operations by performing one or more transformation operations on at least a part of data included in the initial data element without processing the remaining data of the initial data element as indicated by the storage location configuration information, and the one or more transformation operations include a data compression operation and/or an encryption operation;

transmitting the modified data set to the data storage server for storing the modified data set in the database, wherein the modified data set comprises processed data elements included in the first subset and unprocessed initial data elements included in a second subset of the plurality of initial data elements the initial data elements, wherein the first subset of the plurality of initial data elements and the second subset of the plurality of initial data elements together form the modified data set; and converting the initial data elements from human-readable form to binary form before processing; and obtaining the storage location configuration information via the communication interface from the data storage server.

12. A data storage server for operating a database, wherein the data storage server comprises;

a communication interface configured to receive a modified data set from a client device, wherein the modified data set comprises a first subset of processed data elements and a second subset of unprocessed initial data elements; and a processing circuitry configured to store each of the processed data elements and each of the unprocessed initial data elements of the modified data set in a respective storage location of the database;

wherein the first subset of a plurality of initial data elements and the second subset of the plurality of initial data elements together form the modified data set;

wherein the initial data elements are converted by the client device from human-readable form to binary form before processing; and storage location configuration information is obtained by the client device via the communication interface from the data storage server: wherein before the modified data set being transmitted to the data storage server, whether to apply one or more data processing operations to a respective initial data element to obtain the modified data set including the processed data elements and the unprocessed initial data elements is determined, based on a flag setting with a value of 1 or 0 indicated the storage location configuration information; and wherein applying the one or more data processing operations to the respective initial data element includes that one or more transformation operations are performed on at least a part of data included in the respective initial data element without processing the remaining data of the respective initial data element as indicated by the storage location configuration information, and the one or more transformation operations include a data compression operation and/or an encryption operation.

13. The data storage server of claim 12, wherein the communication interface is further configured to transmit, for each processed data element and for each initial data element, the storage location configuration information based on the storage location to the client device, wherein, for each processed data element, the storage location configuration information is indicative of one or more data processing operations used for generating the processed data element.

14. The data storage server of claim 12, wherein the one or more data processing operations comprise adding metadata to the initial data element.

15. The data storage server of claim 12, wherein the processing circuitry is configured to provide, in response to a data request query from the client device, a further data set from the database to the client device, wherein the further data set comprises a further first subset of processed data elements and a further second subset of initial data elements, wherein the further first subset of processed data elements is complementary to the further second subset of initial data elements and wherein the processed further data elements of the first subset of processed data elements are based on one or more further data processing operations.

16. The data storage server of claim 12, wherein the database is a relational database and the respective storage location is a respective column of a table of the relational database.

17. The data storage server of claim 16, wherein the processing circuitry is configured to store the data set in one or more rows of the table of the relational database.

18. A method of operating a database of a data storage server, wherein the method comprises:

receiving a modified data set from a client device, wherein the modified data set comprises a first subset of processed data elements and a second subset of unprocessed initial data elements; and storing each of the processed data elements and each of the unprocessed initial data elements of the modified data set in a respective storage location of the database;

wherein the first subset of a plurality of initial data elements and the second subset of the plurality of initial data elements together form the modified data set;

wherein the initial data elements are converted by the client device from human-readable form to binary form before processing; and storage location configuration information is obtained by the client device via the communication interface from the data storage server: wherein before the modified data set being transmitted to the data storage server, whether to apply one or more data processing operations to a respective initial data element to obtain the modified data set including the processed data elements and the unprocessed initial data elements is determined, based on a flag setting with a value of 1 or 0 indicated the storage location configuration information; and wherein applying the one or more data processing operations to the respective initial data element includes that one or more transformation operations are performed on at least a part of data included in the respective initial data element without processing the remaining data of the respective initial data element as indicated by the storage location configuration information, and the one or more transformation operations include a data compression operation and/or an encryption operation.

19. The method of claim 18, further comprising:

transmitting, for each processed data element and for each initial data element, the storage location configuration information based on the storage location to the client device, wherein, for each processed data element, the storage location configuration information is indicative of one or more data processing operations used for generating the processed data element.

20. A non-transitory computer-readable storage medium for storing program code which, upon execution by a processor of a computer at a client side, causes the computer to perform a method for storing a data set, including a plurality of initial data elements, in a database of a data storage server, the method including:

determining, for each of the plurality of initial data elements, a storage location of the database for the initial data element;

obtaining storage location configuration information from the data storage server based on the storage location, wherein, for each initial data element of a first subset of the plurality of initial data elements, the storage location configuration information is indicative of one or more data processing operations for processing the initial data element into a processed data element: based on a flag setting with a value of 1 or 0) indicated the storage location configuration information, determining whether to apply the one or more data processing operations to the respective initial data element to obtain a modified data set including processed data elements and unprocessed initial data elements before transmitting the modified data set to the data storage server;

processing, for each initial data element of the first subset of the plurality of initial data elements, the initial data element into the processed data element using the one or more data processing operations by performing one or more transformation operations on at least a part of data included in the initial data element without processing the remaining data of the initial data element as indicated by the storage location configuration information, and the one or more transformation operations include a data compression operation and/or an encryption operation;

transmitting the modified data set to the data storage server for storing the modified data set in the database, wherein the modified data set comprises processed data elements included in the first subset and unprocessed initial data elements included in a second subset of the plurality of initial data elements the initial data elements, wherein the first subset of the plurality of initial data elements and the second subset of the plurality of initial data elements together form the modified data set; and converting the initial data elements from human-readable form to binary form before processing; and obtaining the storage location configuration information via the communication interface from the data storage server.

21. The non-transitory computer-readable storage medium of claim 20, wherein the method further comprises storing the storage location configuration information in a memory, and obtaining the storage location configuration information from the memory.

* * * * *